United States Patent
Uchiyama (10) Patent No.: US 7,575,327 B2
(45) Date of Patent: Aug. 18, 2009

(54) IMAGE DISPLAY APPARATUS

(75) Inventor: Shoichi Uchiyama, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 59 days.

(21) Appl. No.: 12/026,234

(22) Filed: Feb. 5, 2008

(65) Prior Publication Data
US 2008/0192155 A1    Aug. 14, 2008

(30) Foreign Application Priority Data
Feb. 13, 2007    (JP) .............................. 2007-032559

(51) Int. Cl.
*G03B 21/14* (2006.01)
(52) U.S. Cl. .............................. 353/30; 353/94; 349/7; 349/74
(58) Field of Classification Search .................. 353/30, 353/31, 34, 37, 94; 349/5, 7, 8, 74
See application file for complete search history.

(56) References Cited

U.S. PATENT DOCUMENTS

| | | | | |
|---|---|---|---|---|
| 5,978,142 | A * | 11/1999 | Blackham et al. | 359/618 |
| 7,175,279 | B2 * | 2/2007 | Drazic et al. | 353/31 |
| 7,236,285 | B2 * | 6/2007 | Uchiyama et al. | 359/242 |
| 7,431,460 | B2 * | 10/2008 | Hall et al. | 353/30 |
| 7,453,475 | B2 * | 11/2008 | Nitta et al. | 345/690 |
| 2005/0174495 | A1 * | 8/2005 | Itoh et al. | 348/758 |
| 2006/0082692 | A1 | 4/2006 | Kamijima et al. | |
| 2006/0203202 | A1 * | 9/2006 | Uchiyama et al. | 353/31 |

FOREIGN PATENT DOCUMENTS

| | | |
|---|---|---|
| JP | A-2005-250440 | 9/2005 |
| JP | A-2006-113371 | 4/2006 |
| JP | A-2006-126261 | 5/2006 |
| JP | A-2006-308641 | 11/2006 |

OTHER PUBLICATIONS

"High Dynamic Range Projection Technology White Paper"; *HDR Projection White Paper*; Brightside; vol. 2.1; Jan. 2006.

* cited by examiner

*Primary Examiner*—William C Dowling
(74) *Attorney, Agent, or Firm*—Oliff & Berridge, PLC (57) ABSTRACT

An image display apparatus includes: a light source; a first light modulation element which has a plurality of pixels whose light modulation characteristics can be independently controlled and modulates light emitted from the light source; a second light modulation element which has a plurality of pixels whose light modulation characteristics can be independently controlled and modulates light emitted from the first light modulation element; and a relay optical system disposed between the first light modulation element and the second light modulation element to create an image formation surface by forming an optical image produced by the first light modulation element at a predetermined position. A pixel surface of the second light modulation element is positioned away from the image formation surface of the optical image produced by the first light modulation element.

6 Claims, 6 Drawing Sheets

IMAGE DISPLAY APPARATUS

BACKGROUND

1. Technical Field

The present invention relates to an image display apparatus, and more particularly to an image display apparatus which includes a double light modulation element structure having a first light modulation element and a second light modulation element.

2. Related Art

Recently, improvement over image quality of electronic displays such as LCD (liquid crystal display), EL (electroluminescence) display, plasma display, CRT (cathode ray tube), and projector has been remarkable, and devices having high performance substantially equivalent to vision characteristics of humans in view of resolution and color range are under development. However, according to these displays, reproducibility of the luminance dynamic range is only in the range from about 1 to about $10^2$ [nit], and the typical gradation number is 8 bits. As for the vision of humans, however, the luminance dynamic range of recognition at a time is about $10^{-2}$ to $10^4$ [nit], and the luminance distinction capability is 0.2 [nit], which corresponds to 12 bits when converted into gradation number. When display images on a display apparatus currently available are viewed through these vision characteristics, the narrowness of the luminance dynamic range of the device is emphasized. Moreover, the gradations of shadows and highlights are insufficient. Thus, the viewers are not satisfied with the images on the display in view of reality and power of the images.

In case of CG (computer graphics) used in movies, games and the like, the movement of pursuit for reality of description by giving a luminance dynamic range and gradation characteristics close to the vision of humans to display data (hereinafter referred to as HDR (high dynamic range) display data) is coming to the mainstream. However, the ability of expression the CG contents originally posses cannot be fully offered due to insufficient performance of the display apparatus used to provide the description.

In addition, the OS (operation system) coming next will adopt 16-bit color space, which greatly increases the dynamic range and gradation number from those of the 8-bit color space currently used. It is thus estimated that demand for such an electronic display apparatus which can provide sufficient dynamic range and gradation number for utilizing the 16-bit color space increases.

In various types of display apparatus, projection type display apparatus (projectors) such as liquid crystal projector and DLP (digital light processing, trademark) projector can provide particularly large screen display, and therefore is an effective display apparatus for reproducing reality and power of display images. For overcoming the above drawbacks, the following technology has been proposed in this field.

According to the basic structure adopted in a projector which enlarges luminance dynamic range in this technology, light emitted from a light source is modulated by a first light modulation element to create desired illumination light quantity distribution. This illumination light quantity distribution is transmitted onto a second light modulation element. After further modulated by the second light modulation element, illumination is provided. Each of the light modulation elements is constituted by a transmission type light modulation element which has a pixel structure or a segment structure whose light propagation characteristics can be independently controlled and controls two-dimensional transmittance distribution. A liquid crystal light valve is a typical example of the transmission type light modulation element. JP-A-2005-250440 discloses an example of the liquid crystal light valve. According to this example, a relay lens is disposed on an optical path between the first light modulation element and the second light modulation element, and an optical image of the first light modulation element is supplied to the light entrance surface of the second light modulation element via the relay lens. Alternatively, a reflection type light modulation element may be used instead of the transmission type light modulation element, and a typical example of the reflection type light modulation element is a DMD (digital micromirror device) element.

It is now assumed that a light modulation element used has transmittance of 0.2% for dark display and transmittance of 60% for bright display. A related-art projection type display apparatus uses this light modulation element as a single unit, and the obtained luminance dynamic range is 60/0.2=300. On the other hand, the display apparatus discussed above has a structure where two units of this light modulation element having the luminance dynamic range of 300 are disposed optically in series. In this case, the luminance dynamic range of 300×300=90000 can be achieved theoretically. The same theory is applicable to the gradation number. By disposing the light modulation elements each of which has 8-bit gradation number optically in series, the gradation number larger than 8 bits can be obtained.

The first light modulation element and the second light modulation element are separately driven by a first modulation signal and a second modulation signal produced from an image signal, respectively.

According to the projection type display apparatus disclosed in JP-A-2005-250440, the optical image of the first light modulation element is supplied to the second light modulation element by using the relay lens. In this case, deviation or distortion of image-formation magnification is caused on the optical image of the first light modulation element due to optical aberration and manufacture error of the relay lens or for other reasons, or discrepancy of alignment between the optical image and the second light modulation element. As a result, the grid structures of the pixels contained in the first light modulation element and the second light modulation element interfere with one another, thereby causing moiré effect and considerably deteriorating the display image quality. For reducing generation of moiré effect, highly accurate relay lens and alignment mechanism need to be equipped, which increases the cost of the apparatus.

In order to overcome these drawbacks, a structure eliminating the relay lens between the first light modulation element and the second light modulation element is considered. Even in this case, the optical image of the first light modulation element is projected on the screen, and thus light emitted from the first light modulation element is subject to diffraction while passing through the second light modulation element. As a result, the projection image on the screen becomes a multiple image, which lowers the display image quality. Moreover, fine luminance control over each pixel cannot be performed when the relay lens is eliminated, and therefore precise image expression cannot be achieved.

SUMMARY

It is an advantage of some aspects of the invention to provide an image display apparatus capable of preventing lowering of display image quality caused by moiré or diffraction between first and second light modulation elements and increasing luminance dynamic range and gradation number while improving display quality without raising cost.

An image display apparatus according to a first aspect of the invention includes: a light source; a first light modulation element which has a plurality of pixels whose light modulation characteristics can be independently controlled and modulates light emitted from the light source; a second light modulation element which has a plurality of pixels whose light modulation characteristics can be independently controlled and modulates light emitted from the first light modulation element; and a relay optical system disposed between the first light modulation element and the second light modulation element to create an image formation surface by forming an optical image produced by the first light modulation element at a predetermined position. A pixel surface of the second light modulation element is positioned away from the image formation surface of the optical image produced by the first light modulation element.

The "pixel surface" herein refers to a surface on which a pixel grid structure of the light modulation element is formed. For example, when a grid-shaped light blocking layer (so-called black matrix) is formed on the liquid crystal layer side surface of one of two substrates constituting a liquid crystal device in a structure of a liquid crystal light valve used as the light modulation element, this surface having the light blocking layer is called the pixel surface. In this case, however, the liquid crystal layer side surface of the one substrate on which the light blocking layer is formed may be substantially similar to the surface on which a liquid crystal layer is formed in the entire thickness of the liquid crystal apparatus, considering the thickness proportions of the respective films in the entire thickness of the liquid crystal device. Thus, it may be considered that the surface having the liquid crystal layer corresponds to the pixel surface.

According to an image display apparatus having a double light modulation element structure of first and second light modulation elements in related art, an optical image produced by the first light modulation element is formed on the pixel surface of the second light modulation element at the time of formation of the optical image produced by the first light modulation element via a relay optical system. In this case, moiré effect is caused by optical aberration or manufacture error of the relay lens, which lowers the image quality. According to the image display apparatus of the first aspect of the invention, the pixel surface of the second light modulation element is positioned away from the image formation surface of the optical image of the first light modulation element. Thus, the optical image of the first light modulation element is in defocus condition on the pixel surface of the second light modulation element, which prevents generation of the moiré effect. Moreover, the structure according to the first aspect of the invention can be provided only by controlling the mutual positions of the first light modulation element, the relay optical system, and the second light modulation element with no necessity for highly accurate relay lens and alignment mechanism. Thus, the cost is not raised.

According to the first aspect of the invention, the following structure is preferable. One of the first light modulation element and the second light modulation element has a plurality of color modulation light valves which modulate a plurality of color lights having different wavelength ranges in wavelength ranges of lights emitted from the light source. The other of the first light modulation element and the second light modulation element has a luminance modulation light valve which modulates lights in the wavelength ranges corresponding to the plurality of color lights in the wavelength ranges of the lights emitted from the light source. A projection optical system which projects light modulated by the second light modulation element toward a projection receiving surface is provided. The color modulation light valves are optically conjugated with the projection receiving surface via the projection optical system or both the projection optical system and the relay optical system.

When either the first light modulation element or the second light modulation element has the plural color modulation light valves which modulate a plurality of color lights having different wavelength ranges, the image display apparatus can display a color image. In this case, the color image is projected on the projection receiving surface with either the color modulation light valves or the luminance modulation light valve under the defocus condition. According to this structure, the color modulation light valve optically conjugated with the projection receiving surface is brought into focus, and the luminance modulation light valve is in defocus condition during display. This arrangement is employed based on the advantage that the color modulation light valves can modulate both luminance information and color information and thus display more image information in focus when brought into focus compared with the luminance modulation light valve which can only modulate luminance information.

According to the first aspect of the invention, the following structure is preferable. The first light modulation element has a plurality of color modulation light valves which modulate a plurality of color lights having different wavelength ranges in wavelength ranges of lights emitted from the light source. The second light modulation element has a luminance modulation light valve which modulates lights in the wavelength ranges corresponding to the plurality of color lights in the wavelength ranges of the lights emitted from the light source. A clearance between the pixel surface of the second modulation element and the image formation surface of the optical image produced by the first light modulation element is established such that a distance between a primary diffraction image of the pixels of the first light modulation element and a zero order diffraction image of the pixels the first light modulation element produced by the second light modulation element is equal to or smaller than a pixel pitch of the plural pixels of the first light modulation element.

When the first light modulation element has the plural color modulation light valves which modulate a plurality of color lights having different wavelength ranges, the image display apparatus can display a color image. Moreover, the structure according to the first aspect of the invention can prevent generation of the moiré effect by disposing the pixel surface of the second light modulation element away from the image formation surface of the optical image of the first light modulation element. However, diffraction increases when the distance between the pixel surface of the second light modulation element and the image formation surface of the optical image of the first light modulation element is excessively long. In this case, the sense of details of the image lowers. This decrease in the sense of details can be prevented when the clearance between the pixel surface of the second modulation element and the image formation surface of the optical image is established such that the distance between the primary diffraction image of the pixels of the first light modulation element and the zero order diffraction image of the pixels the first light modulation element produced by the second light modulation element is equal to or smaller than the pixel pitch of the plural pixels of the first light modulation element. The details of this point will be described in the "description of exemplary embodiments".

More specifically, it is preferable that the following equations (1) and (2) are satisfied assuming that the distance between the pixel surface of the second light modulation element and the image formation surface of the optical image produced by the first light modulation element is D and that the pitch of the zero order pixel images on the image formation surface of the optical image is p:

$$D \leq p/\tan[\sin^{-1}(\lambda/p2)] \quad (1)$$

$$p = mr \cdot p1 \quad (2)$$

(where λ: wavelength of light, p1: pixel pitch of first light modulation element, p2: pixel pitch of second light modulation element, mr: image formation magnification of relay optical system).

The lowering of the sense of details of the image caused by diffraction can be reduced when the above parameters of the image display apparatus (clearance between pixel surface of second light modulation element and image formation surface of optical image produced by first light modulation element, pitch of zero order pixel images on image formation surface of optical image, pixel pitch of first light modulation element, pixel pitch of second light modulation element, and image formation magnification of relay optical system) are established in such a manner as to satisfy the equations (1) and (2). The details of this point will be described in the "description of exemplary embodiments".

According to the image display apparatus of the first aspect of the invention, it is preferable that the pixel pitch of the second light modulation element is larger than the pixel pitch of the first light modulation element.

According to this structure, the clearance between the pixel surface of the second light modulation element and the image formation surface of the optical image produced by the first light modulation element (D in the above equation (1)) can be increased, and therefore the defocus condition of the optical image of the first light modulation element on the pixel surface of the second light modulation element can be further widened. As a result, generation of moiré can be further reduced. Moreover, the structures of the relay lens and the alignment mechanism can be simplified, and thus cost reduction of the apparatus can be achieved.

An image display apparatus according to a second aspect of the invention includes: a light source; a first light modulation element which has a plurality of pixels whose light modulation characteristics can be independently controlled and modulates light emitted from the light source; and a second light modulation element which has a plurality of pixels whose light modulation characteristics can be independently controlled and modulates light emitted from the first light modulation element. A clearance between the pixel surface of the second modulation element and the pixel surface of the first light modulation element is established such that a distance between a primary diffraction image of the pixels of the first light modulation element and a zero order diffraction image of the pixels the first light modulation element produced by the second light modulation element is equal to or smaller than a pixel pitch of the plural pixels of the first light modulation element.

The structure of the image display apparatus according to the second aspect of the invention can be provided by increasing the clearance between the pixel surface of the second light modulation element and the image formation surface of the optical image produced by the first light modulation element (D in the above equation (1)). Also, this structure does not have a relay optical system. Thus, the image display apparatus can reduce the moiré effect and decrease in the sense of details caused by diffraction, and provide high-quality display while achieving cost reduction of the apparatus.

BRIEF DESCRIPTION OF THE DRAWINGS

The invention will be described with reference to the accompanying drawings, wherein like reference numbers are given to like elements.

DESCRIPTION OF EXEMPLARY EMBODIMENTS

First Embodiment

A first embodiment of the invention is hereinafter described with referenced to FIGS. 1 through 8.

An image display apparatus according to this embodiment is an example of a double modulation system projection type image display apparatus which uses a liquid crystal light valve for both of a first light modulation element and a second light modulation element. The first light modulation element disposed near a light source (upstream side) has three transmission type liquid crystal light valves (color modulation liquid crystal light valves) for modulating different color lights of red light (R), green light (G) and blue light (B). The second light modulation element disposed far from the light source (downstream side) has one transmission type liquid crystal light valve (luminance modulation liquid crystal light valve) for modulating light produced by synthesizing the respective color lights modulated by the first light modulation element.

Figure 1:
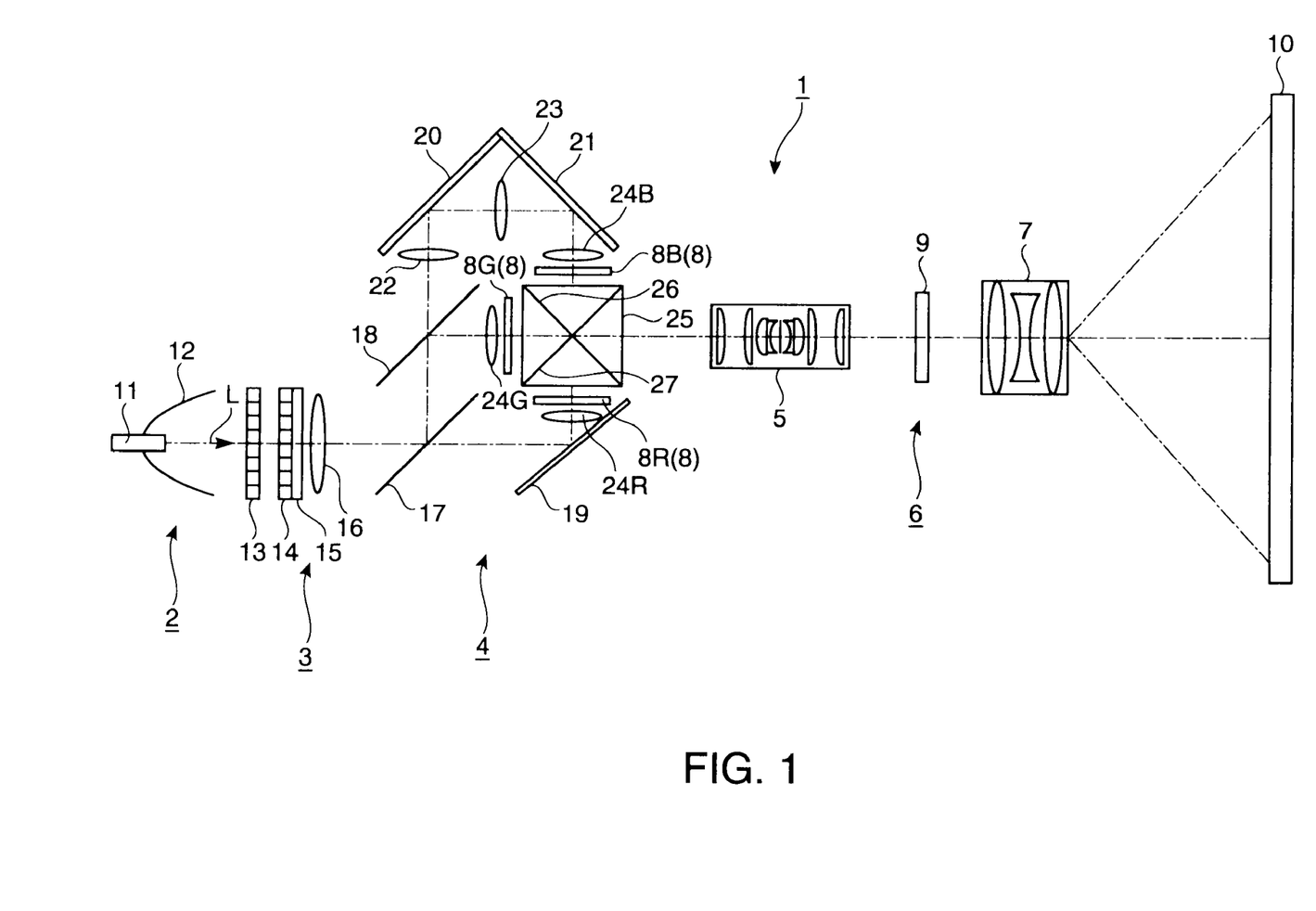
FIG. 1 schematically illustrates a structure of a projection type image display apparatus according to a first embodiment of the invention.
Figure 2:
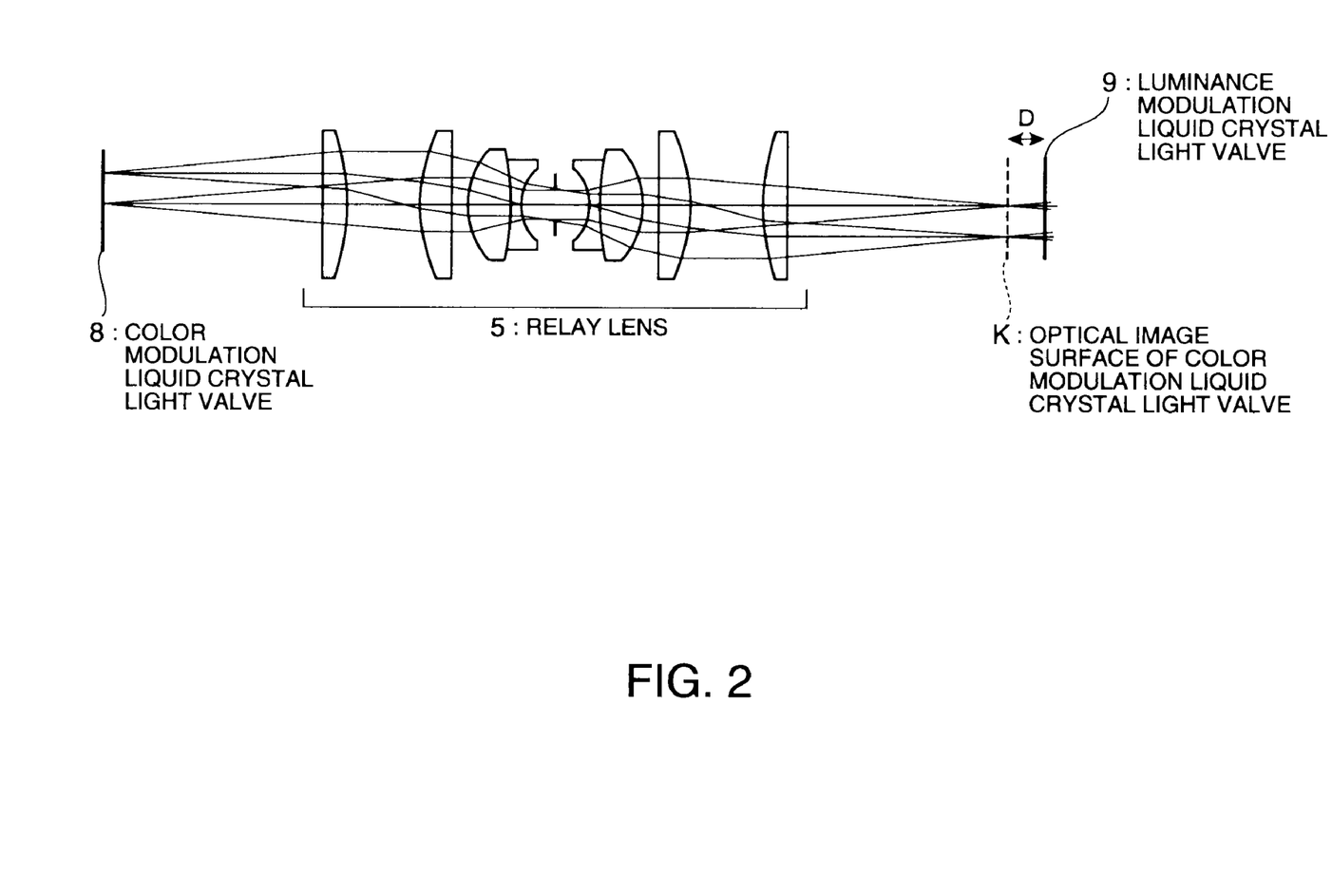
FIG. 2 shows the positional relationship between a color modulation liquid crystal light valve and a luminance modulation liquid crystal light valve included in the image display apparatus.
Figure 3:
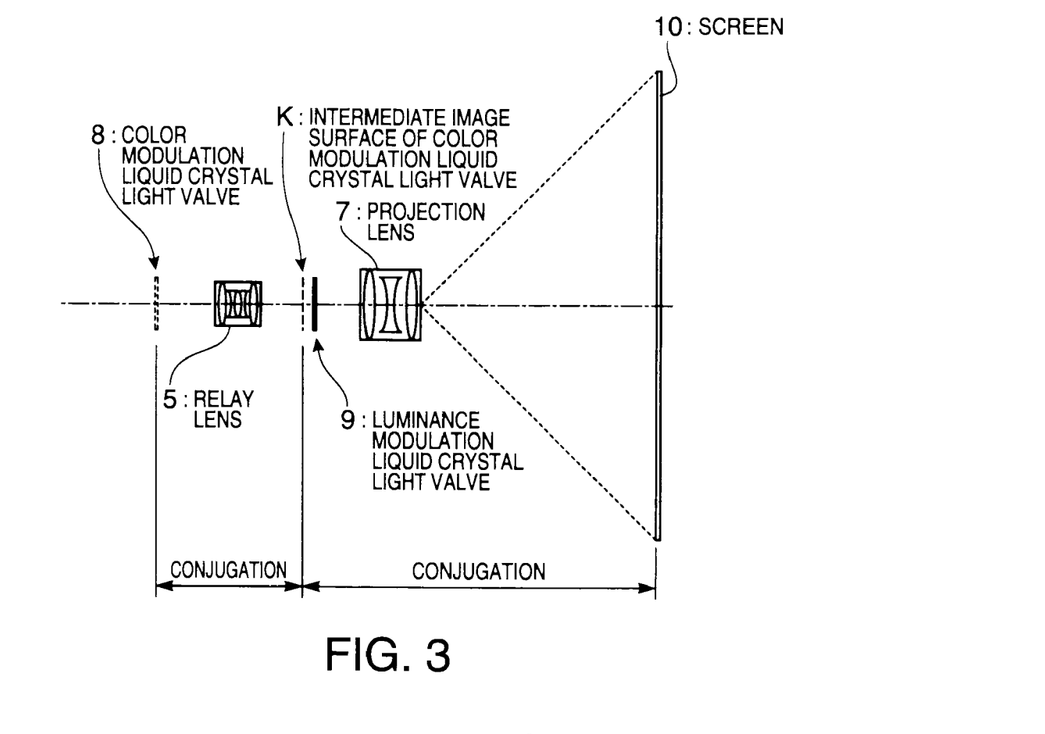
FIG. 3 shows a conjugate relation of a screen projection image.
Figure 4:
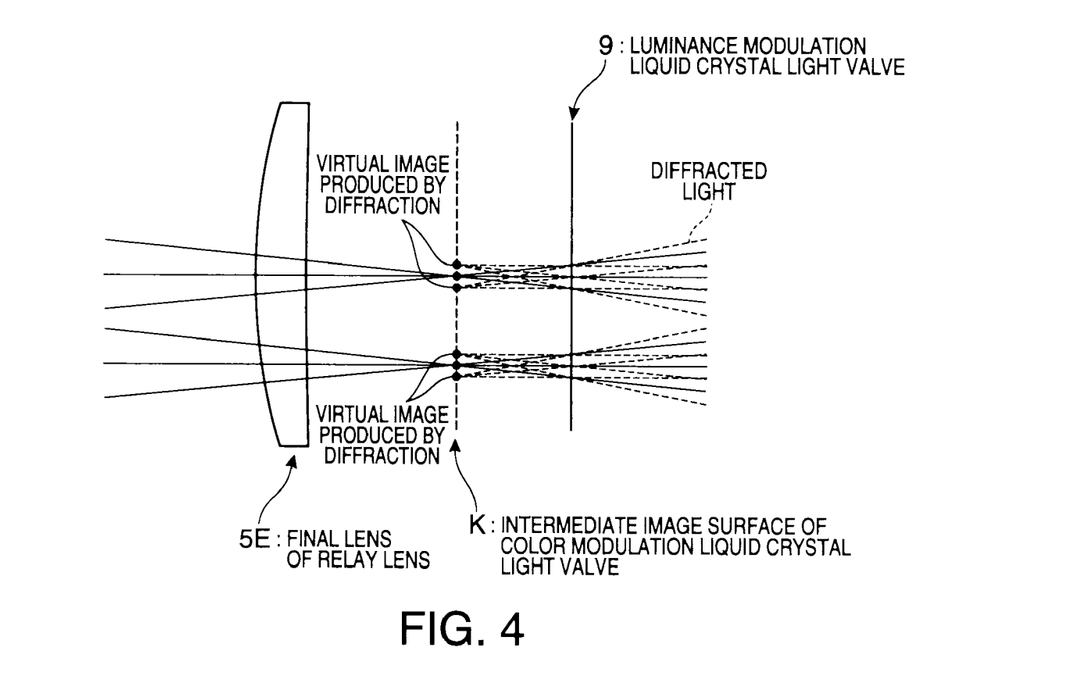
FIG. 4 shows a condition of light in the vicinities of an intermediate image surface of the color modulation light valve and the luminance modulation liquid crystal light valve.
Figure 5:
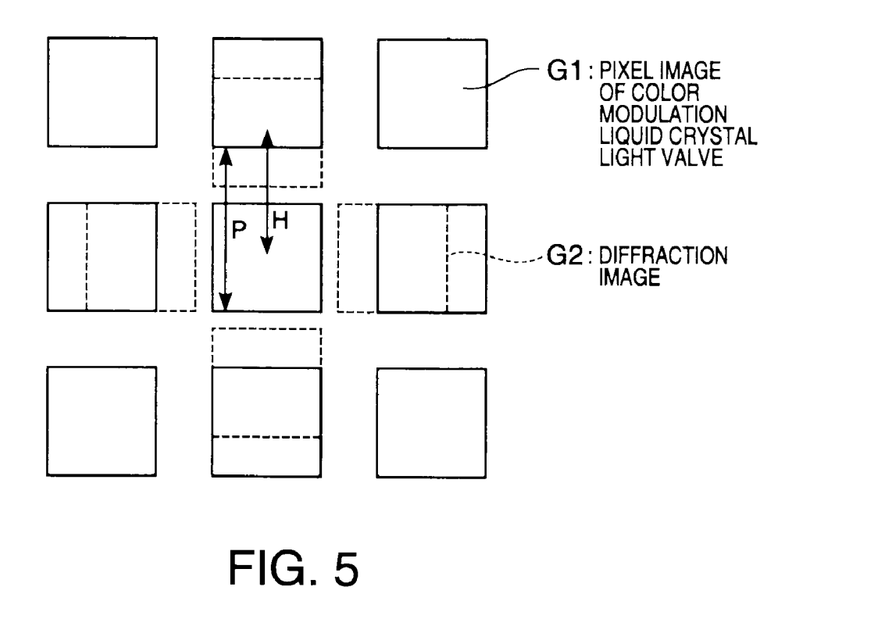
FIG. 5 shows a screen image when diffraction is generated in the luminance modulation light valve.
Figure 6:
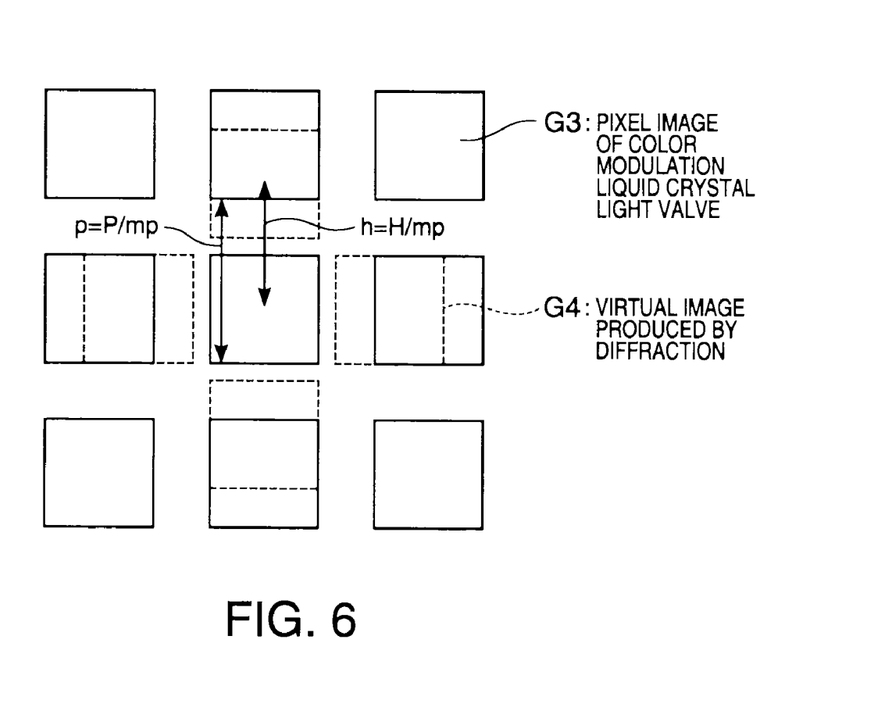
FIG. 6 shows the positional relationship between a pixel image on the intermediate image surface of the color modulation light valve and a virtual image produced by diffraction.
Figure 7:
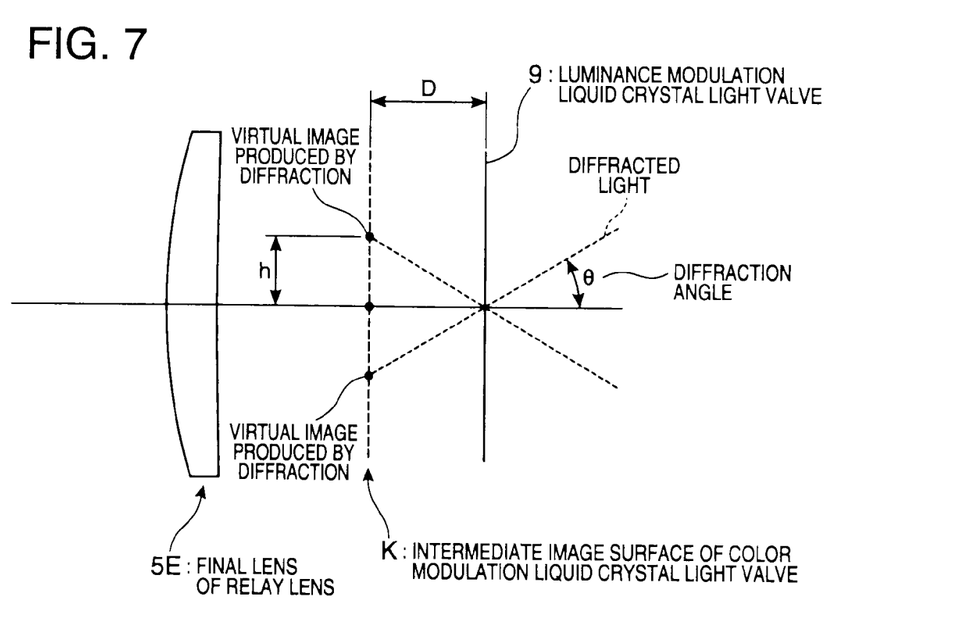
FIG. 7 shows the positional relationship between a distance D from the intermediate image surface of the color modulation light valve to a pixel surface of the luminance modulation light valve and a distance h from the pixel image to the virtual image.
Figure 8:
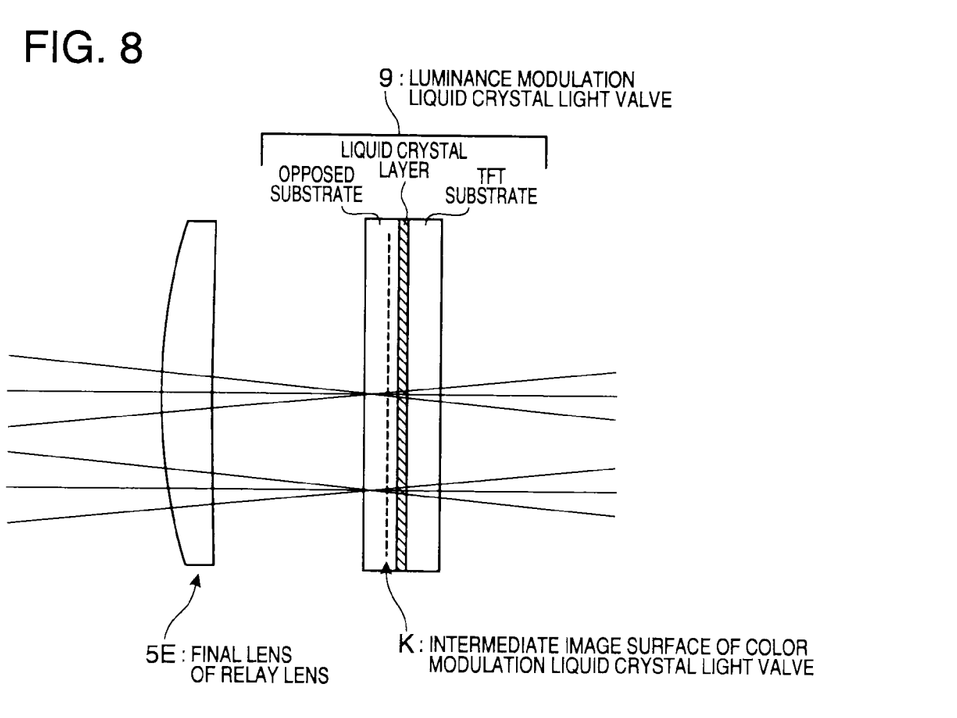
FIG. 8 shows the detailed position of the intermediate image surface of the color modulation liquid crystal light valve.

FIG. 1 is a view (plan view) schematically illustrating a structure of the projection type image display apparatus (projector) in this embodiment. FIG. 2 shows the positional relationship between the color modulation liquid crystal light valve and the luminance modulation liquid crystal light valve included in the image display apparatus. FIG. 3 shows a conjugate relation of a screen projection image. FIG. 4 shows a condition of light in the vicinity of an intermediate image surface of the color modulation light valve and in the vicinity of the luminance modulation liquid crystal light valve. FIG. 5 shows a screen image when diffraction is caused in the luminance modulation light valve. FIG. 6 shows the positional relationship between a pixel image on the intermediate image surface of the color modulation light valve and a virtual image produced by diffraction. FIG. 7 shows the relationship between a distance D from the intermediate image surface of the color modulation light valve to a pixel surface of the luminance modulation light valve and a distance h from a pixel image to a virtual image. FIG. 8 shows the detailed position of the intermediate image surface of the color modulation liquid crystal light valve.

In each of the figures, the sizes and the reduced scales for the positional relations differ for each component and element in some cases for easy visual recognition of the respective components and elements.

Initially, the structure of the projection type image display apparatus is explained with reference to FIG. 1.

A projection type image display apparatus 1 in this embodiment includes a light source 2, an equalizing illumination optical system 3, a color modulation unit 4, a relay lens 5 (relay optical system), a luminance modulation unit 6, and a projection lens 7 (projection optical system). The color modulation unit 4 contains three liquid crystal light valves (first light modulation element) constituted by a blue light liquid crystal light valve 8B, a green light liquid crystal light valve 8G, and a red light liquid crystal light valve 8R, and entrance side polarizing plate (not shown) and exit side polarizing plate (not shown) before and behind each of the light valves (hereinafter, these liquid crystal light valves are collectively referred to as color modulation light valves 8 in some cases). The luminance modulation unit 6 contains a liquid crystal light valve 9 (second light modulation element, hereinafter referred to as luminance modulation light valve in some cases), and entrance side polarizing plate (not shown) and exit side polarizing plate (not shown).

The equalizing illumination system 3 equalizes luminance distribution of light entering from the light source 2. The color modulation unit 4 modulates each luminance of the three primary colors of R, G and B in the wavelength range of light entering from the equalizing illumination system 3. The relay lens 5 supplies the light modulated by the color modulation unit 4 to the luminance modulation light valve 9. The luminance modulation light valve 9 modulates the luminance in the entire wavelength range of the light entering from the relay lens 5. The projection lens 7 projects the light modulated by the luminance modulation light valve 9 onto a screen 10.

The light source 2 has a lamp 11 constituted by a high-pressure mercury lamp, xenon lamp or the like, and a reflector 12 which reflects light emitted from the lamp 11. The equalizing illumination system 3 has a first fly-eye lens 13 and a second fly-eye lens 14 each of which is constituted by a plurality of micro-lenses, a polarization converting element 15, and a converging lens 16. The equalizing illumination system 3 equalizes luminance distribution on the cross section of the light emitted from the light source 2 by using the first fly-eye lens 13 and the second fly-eye lens 14. The light having passed through the first and second fly-eye lenses 13 and 14 is converted into lights in the incident polarization directions of the liquid crystal light valves 8R, 8G and 8B of the color modulation unit 4 by using the polarization converting element 15. The polarized lights are converged by the converging lens 16, and then released toward the color modulation unit 4. The polarization converting element 15 has a polarization beam splitter (PBS) array and a ½ wavelength plate, and converts light in the indefinite polarization condition into particular linear polarized light.

The color modulation unit 4 has two dichroic mirrors 17 and 18 as light dividing units, three mirrors 19, 20 and 21 (reflection mirrors), five field lenses (lens 22, relay lens 23, and collimating lenses 24B, 24G and 24R), three liquid crystal light valves 8B, 8G and 8R, and a cross dicroic prism 25. The liquid crystal light valves 8B, 8G and 8R are liquid crystal panels having plural pixels disposed in matrix and each transmittance of which pixels can be independently controlled. The light crystal light valves 8B, 8G and 8R contain grid-shaped light blocking layers (so-called black matrix) for sectioning the plural pixels in matrix.

The dicroic mirrors 17 and 18 separate (divide) light (white light) emitted from the light source 2 into three primary colors of R light, G light and B light. The R light transmitting dichroic mirror 17 has a dichroic film on a glass plate or the like, which film has characteristics of reflecting the B light and G light and of transmitting the R light. Thus, the R light transmitting dichroic mirror 17 reflects the B light and G light contained in the white light emitted from the light source 2 and transmits the R light. The B light transmitting dichroic mirror 18 has a dichroic film on a glass plate or the like, which film has characteristics of reflecting the G light and of transmitting the B light. Thus, the B light transmitting dichroic mirror 18 reflects the G light of the G and B lights reflected by the R light transmitting dichroic mirror 17 and supplies the G light to the collimating lens 24G, and also transmits and supplies the blue light to the lens 22.

The relay lens 23 supplies light (light intensity distribution) in the vicinity of the lens 22 toward the collimating lens 24B. By the function of the lens 22, light can efficiently enters the relay lens 23. The B light having entered the lens 22 is supplied to the liquid crystal light valve 8B spatially away from the lens 22 with almost no change of intensity distribution and almost no light loss. The collimating lenses 24B, 24G and 24R convert the respective color lights which will enter the corresponding liquid crystal light valves 8B, 8G and 8R into substantially collimated lights so that the lights passing through the liquid crystal light valves 8B, 8G and 8R can efficiently enter the relay lens 5. The three primary color lights of R, G and B divided by the dichroic mirrors 17 and 18 enter the liquid crystal light valves 8B, 8G and 8R via the mirrors discussed above (reflection mirrors 19, 20 and 21) and the field lenses discussed above (lens 22, relay lens 23, collimating lenses 24B, 24G and 24R).

Each of the liquid crystal light valves 8B, 8G and 8R is an active matrix type liquid crystal display element which has TN (twisted nematic) type liquid crystals disposed between a TFT array substrate on which pixel electrodes and switching elements for driving the pixel electrodes such as thin film transistors and thin film diodes are formed in matrix, and an opposed substrate on which a common electrode is formed throughout the surface. Each of the liquid crystal display elements 8B, 8G and 8R also has a polarizing plate on the outer surface. Each of the liquid crystal light valves 8B, 8G and 8R is driven in a normally white mode which produces white/bright (transmission) condition under no voltage application state, and black/dark condition (non transmission) under voltage application state, or in a normally black mode as reversed mode. In this structure, the gradations between white and dark are controlled in an analog manner according to voltage to be applied. The liquid crystal light valve 8B modulates the received B light based on display image data, and releases modulated light containing an optical image. The liquid crystal light valve 8G modulates the received G light based on the display image data, and released modulated light containing an optical image. The liquid crystal light valve 8R modulates the received R light based on the display image data, and released modulated light containing an optical image.

The cross dichroic prism 25 is formed by four rectangular prisms affixed to one another. The cross dichroic prism 25 contains dielectric multilayer film 26 (B light reflection dichroic film) for reflecting the B light and a dielectric multilayer 27 (R light reflection dichroic film) for reflecting the R light, which films 26 and 27 are disposed in such positions as to form an X-shaped cross section. The cross dichroic prism 25 transmits the G light coming from the liquid crystal light valve 8G and reflects the R light and B light coming from the liquid crystal light valves 8R and 8B, respectively, and then the cross dichroic prism 25 synthesizes these three color lights to form a color image.

The relay lens 5 has a function of forming an optical image (light intensity distribution) produced by synthesizing optical images of the liquid crystal light valves 8B, 8G and 8R using the cross dichroic prism 25 on a pixel surface (liquid crystal layer surface) of the liquid crystal light valve 9 disposed downstream. Thus, the relay lens 5 accurately supplies light luminance distribution produced by the liquid crystal light valves 8B, 8G and 8R to the liquid crystal light valve 9. The relay lens 5 is an equal-magnification image formation lens constituted by a front lens group and a rear lens group disposed substantially symmetric with respect to the aperture stop. It is preferable that the relay lens 5 has both-side telecentric characteristics considering the visibility angle characteristics of the liquid crystal light valve. Each of the front lens group and the rear lens group contains plural convex lenses and concave lenses. The lens characteristics such as shape, size, arrangement intervals, number, telecentric characteristics, and magnification may be varied according to the characteristics to be desired.

The liquid crystal light valve 9 is a transmission type light crystal light valve having a structure similar to those of the liquid crystal light valves 8B, 8G and 8R discussed above. The liquid crystal light valve 9 has a function of further modulating the luminance of the optical images produced by the liquid crystal light valves 8B, 8G and 8R. Image light whose luminance has been modulated is supplied to the projection lens 7 (projection optical system), and the light having entered the projection lens 7 is enlarged and displayed on the screen 10 (projection receiving surface) via the projection lens 7.

The positional relationship between the optical image produced by the color modulation light valves 8 and the luminance modulation light valve 9 in the projection type image display apparatus having this structure is now explained.

FIG. 2 illustrates an optical path between the color modulation light valves 8 and the luminance modulation light valve 9 shown in FIG. 1. In this figure, only one color modulation light valve of the color modulation light valves 8 is shown, and the cross dichroic prism 25 provided between the color modulation light valves 8 and the relay lens 5 is not shown for simplifying the explanation. The polarizing plate is not shown in the figure, either. Each of the light valves 8 and 9 is indicated by a flat surface having no thickness, which shows the liquid crystal layer contained in the liquid crystal light valve.

According to this embodiment, the luminance modulation light valve 9 is disposed such that the optical image (optical image surface K) produced by the color modulation light valve 8 via the relay lens 5 can be positioned away from the pixel surface (liquid crystal layer surface) of the luminance modulation light valve 9 by a predetermined distance D. Particularly in this embodiment, the pixel surface of the luminance modulation light valve 9 is shifted from the optical image surface K of the color modulation light valve 8 toward the side away from the light source 2 (downstream side).

An appropriate distance for the distance D is now explained with reference to FIGS. 3 through 6.

Respective parameters necessary for explanation are determined as follows: magnification mr of relay lens 5 is 1 (equal magnification); magnification of projection lens 7 is mp; pixel pitch of color modulation light valve 8 is p1; and pixel pitch of luminance modulation light valve 9 is p2.

FIG. 3 shows a conjugate relation of a screen projection image according to this embodiment. The screen projection image is conjugated with an intermediate image of the color modulation light valve 8 by the projection lens 7. The intermediate image of the color modulation light valve 8 is conjugated with the color modulation light valve 8 by the relay lens 5. Thus, the screen 10 is conjugated with the color modulation light valve 8 by the projection lens 7 and the relay lens 5. In this case, the image produced by the color modulation light valve 8 is temporarily formed as an intermediate image by the relay lens 5, and the intermediate image is further formed as an image on the screen 10 by the projection lens 7. In this step, the luminance modulation light valve 9 disposed on the optical path along which the intermediate image is formed on the screen 10 superposes luminance modulation component on the transmitted light, thereby widening the dynamic range of the screen projection image.

FIG. 4 illustrates a condition of light in the vicinity of the intermediate image surface K (image formation surface) of the color modulation light valve 8 and in the vicinity of the luminance modulation light valve 9. The light released from a final lens 5E of the relay lens 5 (indicated by solid lines) produces an image on the intermediate surface K of the color modulation light valve 8, and then enters the luminance modulation light valve 9. The luminance modulation light valve 9 has pixel electrodes, thin film transistor elements, wires and the like disposed in matrix, and further has a black matrix for sectioning these components. Thus, the luminance modulation light valve can be considered as a grid-shaped diffraction grid from an optical viewpoint. In this case, the light having entered the luminance modulation light valve 9 receives diffraction as well as luminance modulation, and generates diffracted light indicated by broken lines. The diffracted light also produces an image on the screen 10 via the projection lens 7, and the point conjugated with the image formation point of the diffracted light on the screen 10 corresponds to a virtual image on the intermediate image surface K of the color modulation light valve 8.

FIG. 5 illustrates a screen projection image produced when diffraction is generated in the luminance modulation light valve 9. Pixel images G1 (indicated by solid lines) and diffraction images G2 (indicated by broken lines) produced by the color modulation light valve 8 are overlapped when formed on the screen 10. In FIG. 5, only diffraction images G2 corresponding to the central pixel image G1 in the nine pixel images G1 are shown for simplifying the explanation. In fact, diffraction images G2 similar to those are generated for each of the pixel images G1. Each of the diffraction images G2 is shifted from the central pixel image G1 by a distance H. Details of this distance H will be described later. The symbol P represents pixel pitch on the screen 10.

When these diffraction images G2 are generated, the area of one pixel image G1 is enlarged from that of the original pixel image during display on the screen 10. When the distance H between the pixel image G1 and the diffraction image G2 is excessively long, the image resolution lowers. According to the examination performed by the present inventors for evaluating the sense of details of the screen projection image by varying the distance H between the pixel image G1 and the diffraction image G2 to investigate the degree of decrease in the image resolution, the following relations have been found.

(1) No great difference in the sense of details is produced between the case H≦1/2·P and the case of no diffraction image generated.

(2) In the case of 1/2·P<H≦P, the sense of details slightly decreases but does not greatly lower.

(3) In the case of H>P, the sense of details greatly lowers.

Considering these relations, the distance D between the intermediate image surface K of the color modulation light valve 8 and the pixel surface of the luminance modulation light valve 9 is established such that H≦P, more preferably H≦1/2·P can be satisfied in this embodiment. Details of this point are now explained with reference to FIGS. 6 and 7.

FIG. 6 shows the positional relationship between pixel images G3 (zero order diffraction image) on the intermediate image surface K of the color modulation light valve 8 and virtual images G4 (primary diffraction image) produced by diffraction. The pitch of the pixel image G3 on the intermediate image surface K is p, and the distance between the pixel image G3 and the virtual image G4 produced by diffraction is h. When the image formation magnification of the projection lens 7 is mp, the values p and h are proportional to the values P and H shown in FIG. 5 as expressed by the following equations:

$$p = P/mp \quad (3)$$

$$h = H/mp \quad (4)$$

Based on the relations shown by the equations (3) and (4), the relations (1), (2) and (3) concerning the sense of details discussed above hold even when the values P and H are replaced with the values p and h.

Moreover, since the magnification mr of the relay lens 5 is 1 as described above, p becomes p1. Accordingly, the following relations hold.

(1') No great difference in the sense of details is produced between the case h≦1/2·p1 and the case of no diffraction image generated.

(2') In the case of 1/2·p1<h≦p1, the sense of details slightly decreases but does not greatly lower.

(3') In the case of h>p1, the sense of details greatly lowers.

Thus, the distance D between the intermediate image surface of the color modulation light valve and the pixel surface of the luminance modulation light valve is established such that h≦p1, more preferably h≦1/2·p1 can be satisfied.

FIG. 7 shows the relationship between the distance D and the distance h between the pixel image and the diffraction image.

According to this embodiment, the position of the pixel surface of the luminance modulation light valve 9 is shifted toward the projection lens 7 (downstream side) from the intermediate image surface K of the color modulation light valve 8. Thus, the principal light passing in the vicinity of the optical axis forms an intermediate image of the color modulation light valve 8, and then is diffracted after entering the luminance modulation light valve 9.

When the pixel pitch of the luminance modulation light valve 9 is p2 as above, a diffraction angle θ is expressed by equation (5):

$$\theta = \sin^{-1}(n\lambda/p2) \quad (5)$$

(n: order of diffracted light, λ: wavelength of diffracted light)

Also, the distance h between the pixel image and the virtual image produced by diffraction is expressed by equation (6):

$$h = D \cdot \tan \theta \quad (6)$$

When the equation (5) is substituted in the equation (6), the following equation (7) is obtained.

$$h = D \cdot \tan[\sin^{-1}(n\lambda/p2)] \quad (7)$$

More specifically, since the wavelength at which the highest spectral luminous efficacy is provided on the screen display image is 0.55 [μm] (green), λ is set at 0.55. Also, in the luminance modulation light valve 9, since the diffraction intensity for the secondary or higher orders is small, n is set at 1 as the primary diffracted light and the pixel pitch p2 of the luminance modulation light valve 9 is set at a value equal to the pixel pitch p1 of the color modulation light valve 8 as p1=p2=10 [μm]. When these values are substituted in the equation (7), the following equation is obtained:

$$h = D \cdot \tan(3.15°) \quad (8)$$

Thus, for satisfying the relation h≦1/2·p1 by using the equation (8), D is set as D≦91 [μm]. Also, for satisfying h≦p1, D is set as D≦181.7 [μm].

According to this embodiment, therefore, the distance D between the intermediate image surface K of the color modulation light valve 8 and the pixel surface of the luminance modulation light valve 9 is as small as about 180 μm or smaller. In this actual optical system, the intermediate image of the color modulation light valve 8 is produced inside the entrance side substrate (opposed substrate) of the luminance modulation light valve 9 as illustrated in FIG. 8.

Thus, the desirable range of the distance D between the intermediate image surface of the color modulation light valve 8 and the pixel surface of the luminance modulation light valve 9 can be expressed by the following general equations (9) and (10).

$$D \leq p/\tan[\sin^{-1}(\lambda/p2)] \quad (9)$$

$$p = mr \cdot p1 \quad (10)$$

According to this embodiment, the intermediate image of the color modulation light valve 8 is in the defocus condition on the pixel surface of the luminance modulation light valve 9 (liquid crystal layer surface in FIG. 8). Thus, the periodical alternations between bright and dark states caused by the grid structure of the color modulation light valve 8 become unclear. As a result, the moiré effect is not caused even when slight alignment error, slight curve, magnification error, magnification color aberration or the like remains on the relay lens 5. Moreover, since the distance between the intermediate image surface K of the color modulation light valve 8 and the pixel surface of the luminance modulation light valve 9 is optimized, the resolution is not lowered by the diffraction in the luminance modulation light valve 9. Accordingly, the projection type image display apparatus provided according to this embodiment can increase the luminance dynamic range and the number of gradations with improvement over the display quality. In addition, the structure according to this embodiment can be constructed only by controlling the position of the luminance modulation light valve 9. In this case, the structures of the relay lens and alignment mechanism can be simplified, and therefore the cost of the entire apparatus can be lowered.

Second Embodiment

According to this embodiment, the distance D between the intermediate image surface K of the color modulation light valve 8 and the pixel surface of the luminance modulation light valve 9 is as small as 180 μm or smaller. However, this distance D can be increased by enlarging the pixel pitch p2 of the luminance modulation light valve 9 from the setting as p1=p2=10 [μm] in the first embodiment.

For example, when the pixel pitch p2 of the luminance modulation light valve 9 is increased to 30 μm with respect to the pixel pitch p1=10 μm of the color modulation light valve 8 (equal to the pixel pitch in the first embodiment), D≦818 [μm] is set for satisfying h≦1/2·p1 and D≦1636 [μm] is set for satisfying h≦p1. Thus, the distance D between the intermediate image surface K of the color modulation light valve 8 and the pixel surface of the luminance modulation light valve 9 can be considerably increased.

The advantage provided by increasing the distance D between the intermediate image surface K of the color modulation light valve 8 and the luminance modulation light valve 9 is that generation of moiré can be more reduced by further enlarging the defocus condition of the intermediate image of the color modulation light valve 8 on the pixel surface of the luminance modulation light valve 9. In this case, the alignment mechanism and the relay lens structure can be simplified, and thus cost reduction of the entire apparatus can be achieved.

Third Embodiment

A third embodiment according to the invention is now described with reference to FIG. 9.

Similarly to the image display apparatus in the first embodiment, an image display apparatus according to this embodiment is a double modulation type projection image display apparatus which uses a liquid crystal light valve for both a first light modulation element and a second light modulation element. The difference in structure between the first embodiment and the third embodiment is that the relay lens for supplying the optical image of the first light modulation element to the second light modulation element is eliminated in the third embodiment.

Figure 9:
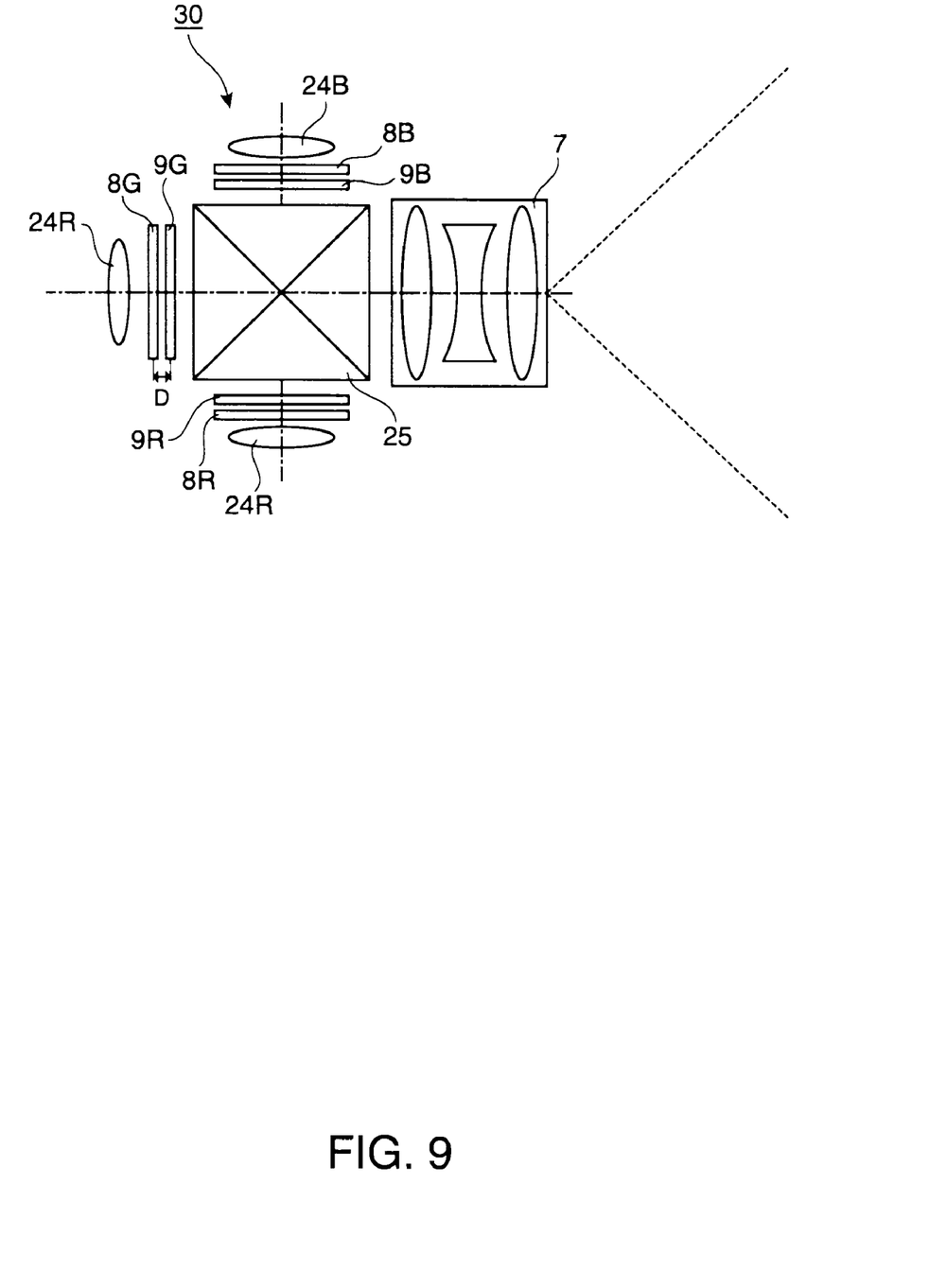
FIG. 9 schematically illustrates a structure of a projection type image display apparatus according to a third embodiment of the invention.

FIG. 9 illustrates only a structure around a color modulation light valve and a luminance modulation light valve of the projection type image display apparatus according to this embodiment. In FIG. 9, the same numbers are given to the same components as those shown in FIG. 1, and detailed explanation of those components is not repeated.

As illustrated in FIG. 9, a projection type image display apparatus 30 according to this embodiment has luminance modulation liquid crystal light valves 9B, 9G and 9R for respective color lights at positions downstream from the color modulation liquid crystal light valves 8B, 8G and 8R for respective color lights with no relay lens interposed between the luminance modulation liquid crystal light valves and the color modulation liquid crystal light valves. In this embodiment, the light valves disposed near the light source (upstream side) are color modulation light valves, and the light valves disposed far from the light source (downstream side) are luminance modulation light valves for simplifying the explanation. In the structure where light is successively modulated by two types of light valves, however, no distinction between color modulation and luminance modulation is needed for the functions of the light valves. Thus, the respective color lights are sequentially modulated by two liquid crystal light valves, synthesized by the dichroic prism 25, and projected on the screen via the projection lens 7.

The distances D between the pixel surfaces of the color modulation light valves 8R, 8G and 8B and the pixel surfaces of the luminance modulation light valves 9R, 9G and 9B are established such that the distances between the pixel images (zero order diffraction images) of the color modulation light valves 8R, 8G and 8B and the diffraction images (primary diffraction images) of the luminance modulation light valves 9R, 9G and 9B can be the pixel pitch of the color modulation light valves 8R, 8G and 8B or shorter. In this embodiment, the pixel surfaces correspond to liquid crystal layer surfaces of the respective liquid crystal light valves similarly to the above embodiments. The structure according to this embodiment can be obtained by setting the pixel pitch of the luminance modulation light valves 9R, 9G and 9B at a sufficiently large value for the pixel pitch p1 of the color modulation light valves 8R, 8G and 8B so as to increase the distance D in the same manner as described in the second embodiment.

The projection type image display apparatus 30 according to this embodiment does not use the relay optical system. Thus, cost reduction of the apparatus can be achieved. Also, the projection type image display apparatus 30 can provide high-quality display by preventing moiré and decrease in the resolution caused by diffraction.

The technical scope of the invention is not limited to the specific examples described herein, and therefore various modifications and changes may be made without departing from the scope and spirit of the invention. For example, while the relay lens, the intermediate image surface of the color modulation light valve, and the luminance modulation light valve are disposed in this order from the light source in the first and second embodiments, these components may be disposed in the order of the relay lens, the luminance modulation light valve, and the intermediate image surface of the color modulation light valve. In other words, the position of the pixel surface of the luminance modulation light valve may be disposed closer to the light source (upstream side) than the position of the intermediate image surface of the color modulation light valve.

The magnification of the relay lens mr is not limited to 1 as established in the embodiments. In addition, while the structure having the first light modulation element constituted by plural color modulation light valves and the second light modulation element constituted by a single luminance modulation light valve has been discussed, the invention is not limited to this and such a structure having the first light modulation element constituted by a single luminance modulation light valve and the second light modulation element constituted by plural color modulation light valves may be employed. In this case, it is preferable that the image display screen has a conjugate relation with the color modulation light valves. Other specific structures contained in the respective optical systems of the projection type image display apparatus shown in the embodiments may be modified in an appropriate manner. The image display apparatus according to the invention is applicable to a direct sight type image display apparatus having no projection optical system as well as the projection type image display apparatus discussed above.

The entire disclosure of Japanese Patent Application No. 2007-032559, filed Feb. 13, 2007 is expressly incorporated by reference herein.

What is claimed is:

1. An image display apparatus, comprising:
   a light source;
   a first light modulation element which has a plurality of pixels whose light modulation characteristics can be independently controlled and modulates light emitted from the light source;
   a second light modulation element which has a plurality of pixels whose light modulation characteristics can be independently controlled and modulates light emitted from the first light modulation element; and a relay optical system disposed between the first light modulation element and the second light modulation element to create an image formation surface by forming an optical image produced by the first light modulation element at a predetermined position, wherein a pixel surface of the second light modulation element is positioned away from the image formation surface of the optical image produced by the first light modulation element.

2. The image display apparatus according to claim 1, wherein:

one of the first light modulation element and the second light modulation element has a plurality of color modulation light valves which modulate a plurality of color lights having different wavelength ranges in wavelength ranges of lights emitted from the light source;

the other of the first light modulation element and the second light modulation element has a luminance modulation light valve which modulates lights in the wavelength ranges corresponding to the plurality of color lights in the wavelength ranges of the lights emitted from the light source;

a projection optical system which projects light modulated by the second light modulation element toward a projection receiving surface is provided; and the color modulation light valves are optically conjugated with the projection receiving surface via the projection optical system or both the projection optical system and the relay optical system.

3. The image display apparatus according to claim 1, wherein:

the first light modulation element has a plurality of color modulation light valves which modulate a plurality of color lights having different wavelength ranges in wavelength ranges of lights emitted from the light source;

the second light modulation element has a luminance modulation light valve which modulates lights in the wavelength ranges corresponding to the plurality of color lights in the wavelength ranges of the lights modulated by the plurality of color modulation light values; and a clearance between the pixel surface of the second modulation element and the image formation surface of the optical image produced by the first light modulation element is established such that a distance between a primary diffraction image of the pixels of the first light modulation element and a zero order diffraction image of the pixels the first light modulation element produced by the second light modulation element is equal to or smaller than a pixel pitch of the plural pixels of the first light modulation element.

4. The image display apparatus according to claim 3, wherein the following equations (1) and (2) are satisfied assuming that the distance between the pixel surface of the second light modulation element and the image formation surface of the optical image produced by the first light modulation element is D and that the pitch of the zero order pixel images on the image formation surface of the optical image is p:

$$D \leq p/\tan[\sin^{-1}(\lambda/p2)] \qquad (1)$$

$$p = mr \cdot p1 \qquad (2)$$

(where $\lambda$: wavelength of light, p1: pixel pitch of first light modulation element, p2: pixel pitch of second light modulation element, mr: image formation magnification of relay optical system.)

5. The image display apparatus according to claim 2, wherein the pixel pitch of the second light modulation element is larger than the pixel pitch of the first light modulation element.

6. An image display apparatus, comprising:

a light source;

a first light modulation element which has a plurality of pixels whose light modulation characteristics can be independently controlled and modulates light emitted from the light source; and a second light modulation element which has a plurality of pixels whose light modulation characteristics can be independently controlled and modulates light emitted from the first light modulation element, wherein a clearance between the pixel surface of the second modulation element and the first light modulation element is established such that a distance between a primary diffraction image of the pixels of the first light modulation element and a zero order diffraction image of the pixels the first light modulation element produced by the second light modulation element is equal to or smaller than a pixel pitch of the plural pixels of the first light modulation element.

* * * * *